United States Patent Office 3,098,078
Patented July 16, 1963

3,098,078
THIO ALKANE CARBOXYLIC ACIDS AND FUNCTIONAL DERIVATIVES THEREOF
Jean Druey, Riehen, and Hans Ulrich Daeniker, Basel, Switzerland, assignors to Ciba Corporation, a corporation of Delaware
No Drawing. Filed Feb. 5, 1959, Ser. No. 791,256
Claims priority, application Switzerland Feb. 19, 1958
13 Claims. (Cl. 260—327)

The present invention relates to new alkane-carboxylic acids of the general formula

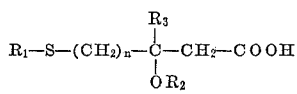

where $R_1$ and $R_2$ represent hydrogen, lower aliphatic radicals, aralkyl radicals, aryl radicals or acyl radicals; $R_3$ represents a hydrocarbon radical; and $n=1$ to 8 and preferably $=2$—their salts and functional carboxyl group derivatives such as esters, thiol esters, amides and hydrazides. Lower aliphatic radicals are, for example, lower alkyl or cycloalkyl radicals, above all methyl, ethyl, propyl, isopropyl, butyl, pentyl, hexyl, cyclopentyl or cyclohexyl, which may bear further substituents, such as free or functionally converted hydroxyl or mercapto groups or halogen atoms. As aralkyl radicals such radicals are to be understood in which an aryl radical which may, fo rexample, be substituted by halogen or free or functionally converted hydroxyl, is bound through a methylene group to the skeleton of the compounds defined; it is preferable to use the benzyl radical. Aryl radicals are preferably phenyl or its substitution products such as, for example, phenyl which is substituted by halogen or free or functionally converted hydroxyl. As acyl radicals there may be mentioned for example esterlike bound radicals of lower fatty acids, particularly formyl, acetyl or propionyl, radicals of substituted fatty acids such as dichloracetyl or aroyl radicals, especially benzoyl. Hydrocarbon radicals are, for example, alkyl groups, preferably lower alkyl groups, particularly methyl, ethyl or propyl. Esters and thiol esters of the carboxyl group are preferably lower alkyl esters, more especially methyl or ethyl esters, or aralkyl esters, more especially benzyl esters. The amides are derived from ammonia, or primary or secondary amines; the hydrazides are derived from free or substituted hydrazines. The invention also comprises the process for preparing the new compounds.

The new thio-alkanecarboxylic acids defined above and their salts and functional derivatives are capable of lowering the cholesterol level of the blood. It is known that a raised cholesterol level of the blood and in various organs such, for example, as the liver accompanies, or may even be the cause of, atherosclerosis. Substances capable of lowering the cholesterol level of the blood have a beneficial influence on atherosclerosis. The new compounds are, therefore, intended for use as medicaments.

The new thio-alkanecarboxylic acids and their functional derivatives are obtained by attaching in a manner known per se a free or functionally converted carboxymethyl group to the carbonyl group of ketones of the general formula $$R_1-S-(CH_2)_n-CO-R_3$$

in which $R_1$ represents a lower aliphatic radical, an aralkyl radical, an aryl radical or an acyl radical, $R_3$ a hydrocarbon radical and $n=1$ to 8, and, if desired, in resulting compounds liberating functionally converted hydroxyl, mercapto and/or carboxyl groups, or functionally converting free groups and/or preparing salts. Such ketones are used for this purpose that the compounds particularly pointed out above are obtained.

It is of advantage when the reaction is performed according to Reformatzky's method. For example, the above-defined ketones are reacted with α-halogenoacetic acid esters, primarily bromoacetic acid ethyl ester, and zinc in the presence or absence of a suitable solvent.

The reaction is carried out by a method known per se. There is used particularly β-mercaptoethyl-methyl-ketone of which the mercapto group is substituted by the above-defined radical $R_1$. For example there is used β-acetyl-mercapto-butanone-(3), β - isopropyl-mercapto-butanone-(3) or β-benzyl-mercapto-butanone-(3).

The second reactant is an ester of an α-halogenoacetic acid, preferably of bromoacetic acid, with an alcohol, preferably an alkanol such as methanol, ethanol, or a benzyl alcohol. Examples of suitable solvents are: ether, benzene-hydrocarbons or mixtures thereof, but preferably diethyl ether. If desired, the condensation reaction is performed in the presence of iodine and/or a metal salt such, for example, as mercuric chloride or anhydrous aluminum chloride.

This reaction can be exemplified by the following formulae:

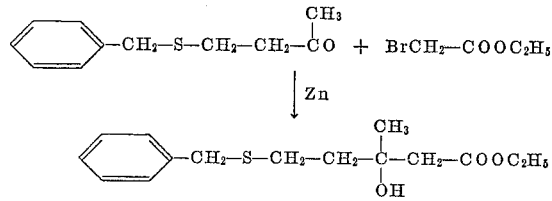

When β-acetylmercaptobutanone-(3) is reacted with bromoacetic acid ethyl ester, the acetyl group migrates from the terminal mercapto group to the newly formed tertiary hydroxyl group:

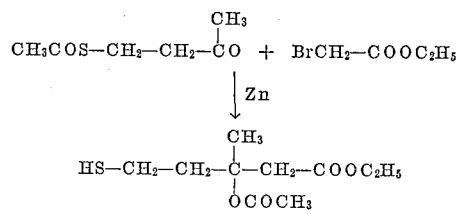

According to the reaction conditions employed, hydroxyl, mercapto and carboxyl groups in the resulting compounds are free and/or functionally converted. If desired, the free groups can be functionally converted, or they may be used for the formation of salts, and/or the functionally converted groups can be functionally rearranged or converted into the free groups and/or into their salts.

The conversion of the functionally converted groups into the free hydroxyl, mercapto and/or carboxyl groups can be achieved, for example, by hydrolysis by a method as such known with the use of a basic or acidic agent in water, in an alcohol or an aqueous alcohol, preferably in aqueous ethanol. Suitable basic agents are hydroxides, carbonates or bicarbonates of alkali metals or alkaline earth metals, salts of alkali metals with weak organic acids such as sodium acetate, ammonia or its functional derivatives, or an ion-exchanger resin containing basic groups. Suitable acidic agents are inorganic acids such as hydrohalic acids, sulfuric acids or phosphoric acids, organic acids such as alkanecarboxylic acids, aliphatic or aromatic sulfonic acids, or ion-exchanger resins comprising acid groups. Furthermore, derivatives carrying suitable substituents on the sulfur atom can be reduced to derivatives containing a free mercapto group. Suitable substituents on the sulfur atom are, for the present purpose, aralkyl radicals whose aryl radical is linked to the sulfur atom via a methylene group. The aryl group may bear further substituents, for example, halogen or free or functionally converted hydroxyl. The benzyl radical is preferably used. The reduction is performed by a method as such known, for example with sodium in liquid ammonia.

The conversion of free groups into functionally converted groups is performed by methods as such known. For example, hydroxyl and/or mercapto groups can be acylated or aralkylated, or a lower aliphatic radical, such as an alkyl or cycloalkyl group, is introduced. The reaction is carried out in such a way that the compounds particularly mentioned above are obtained. The carboxyl group can be esterified or amidified, for example, either directly or via the acid chloride.

More especially, the carboxyl group and its functional derivatives, such as esters, can be linked intramolecularly with the mercapto group to form a thiol ester or a thiolactone. For example, thiolactones of the general formula

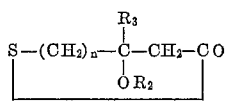

where $R_2$, $R_3$ and $n$ have the above meanings—can be prepared.

The thio-alkane-carboxylic acids defined above and their functional derivatives form salts, a free carboxyl group and/or a free mercapto group acting as acid components. Suitable basic components are metal hydroxides, more especially the hydroxides of alkali metals or alkaline earth metals, or organic bases such as ammonia or amines, more especially N:N'-dibenzylethylene diamine.

The ketones used as starting materials and described above are known or can be made by known methods. The preferentially used S-substituted β-mercapto-ethylalkyl ketones are obtained, for example, by attaching a substituted mercaptan to a vinyl-alkyl ketone, as is known, it is particularly advantageous to attach a thiocarboxylic acid such, for example, as thioacetic acid, or a hydrocarbon-mercaptan such as for example isopropyl mercaptan or benzyl-mercaptan, to methyl-vinyl ketone.

The addition reaction can be performed in the presence of an inert diluent but is preferably carried out by simply mixing the two reactants together. The reaction can be performed at any desired temperature between —10° C. and the boiling point of the reactant having the lower boiling point, preferably however at first at 0° C., the temperature then being raised from room temperature to 100° C. to complete the reaction. Substances may also be used which catalyse the reaction, e.g. Lewis acids such as aluminum chloride.

The invention further covers any modification of the process in which an intermediate obtained at any stage thereof is used as starting material, the remaining step or steps being carried out or the process being discontinued at any desired stage.

The reactions are performed in known manner in the presence or absence of diluents and/or condensing agents and/or catalysts, at the ordinary or an elevated temperature, under atmospheric or superatmospheric pressure.

The thio-alkanecarboxylic acids described hereinbefore can be used as medicaments, for example in the form of pharmaceutical preparations which contain the specified compounds in admixture with a pharmaceutical organic or inorganic excipient suitable for enteral, parenteral or local administration. Suitable substances for the formulation of the excipient are those which do not react with the new compounds such, for example, as gelatine, lactose, starches, magnesium stearate, talc, vegetable oils, benzyl alcohols, gums, polyalkylene glycols, white petroleum jelly or other known medicinal excipients. The pharmaceutical preparations may be, for example, in the form of tablets, dragees, powders, ointments, creams, suppositories, or in liquid form as solutions, suspensions or emulsions. If desired, they are sterilized and/or contain assistants such as preservatives, stabilizers, wetting agents or emulsifiers. They may further contain other therapeutically valuable substances.

The following examples illustrate the invention without thereby limiting its scope.

Example 1

96 grams of zinc filings (in the form of a fine powder obtained by heating and agitation in vacuo), 2 grams of iodine, a trace of mercuric chloride and 150 cc. of absolute ether are introduced into a stirring flask fitted with dropping funnel and reflux condenser, and a solution of 60 grams of β-acetyl-mercapto-butanone-(3) and 68 grams of bromoacetic acid ethyl ester in 120 cc. of absolute ether is then added dropwise with exclusion of moisture, stirring and heating at the boil. When ¼ to ½ of the solution in the dropping funnel has been added, a strongly exothermic reaction sets in, whereupon the remainder of the solution is stirred in dropwise so that the reaction mixture is kept boiling constantly without supply of external heat. When all has been added, the whole is refluxed with stirring overnight, then cooled to room temperature and the contents of the flask are poured with stirring on to 500 grams of ice. 2 liquid layers result which are separated in a separating funnel. The organic phase is washed twice with 100 cc. of 10% aqueous sodium bicarbonate solution on each occasion and once with 100 cc. of saturated aqueous ammonium sulfate solution, and the aqueous phase is washed on the filter twice with 100 cc. of ether on each occasion. The ethereal extracts are combined, dried over anhydrous sodium sulfate and filtered. The ether is evaporated and an oil is obtained which is distilled in a high vacuum. The fraction passing over at 83–88° C. (under a pressure of 0.15 mm. Hg) is once more fractionated to yield 44 grams of β-methyl-β-acetoxy-delta-mercapto-valeric acid ethyl ester of the formula

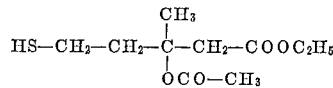

as a colorless oil boiling at 81–83° C. under 0.1 mm. Hg pressure. In the form of a solution in methylene chloride the substance displays in the infrared absorption spectrum the bands characteristic of carboxylic acid esters and O-acetates respectively at 5.76μ and 8.12μ, but neither an OH-band nor a thiol ester-band is present. With mercuric acetate in aqueous acetic acid the compound gives the precipitate characteristic of mercaptans.

The starting material can be prepared thus:

70 grams of methyl-vinyl ketone are cautiously stirred at 0° C. into 70 cc. of thioacetic acid, the mixture is kept for 4 hours at 0° C. and then for 15 hours at room temperature and finally heated for 2 hours on a steam bath. The mixture is then distilled to yield 77.1 grams of β-acetyl-mercapto-butanone-(3) as a slightly yellowish oil boiling at 103–106° C. under 14 mm. Hg pressure. In the infrared absorption spectrum a solution of this compound in methylene chloride displays, inter alia, bands at 5.81μ (ketone) and at 5.90μ (thiol ester).

Example 2

15.7 grams of β-methyl-β-acetoxy-delta-mercapto valeric acid ethyl ester (Example 1) are kept overnight at room temperature in a mixture of 100 cc. of acetic anhydride and 75 cc. of pyridine. The solution is then evaporated to dryness on a steam bath under reduced pressure. The oily residue is taken up in 100 cc. of chloroform and washed with 2 N-hydrochloric acid and aqueous sodium bicarbonate solution of 10% strength. The chloroformic solution is filtered through anhydrous sodium sulfate, the filtrate is evaporated to dryness, and the residual oil is distilled twice in a high vacuum to yield 12.4 grams of β-methyl-β-acetoxy-delta-acetylmercapto valeric acid ethyl ester as a colorless oil boiling at 102° under 0.08 mm. Hg pressure. Apart from the bands characteristic of carboxylic acid esters and O-acetates respectively at 5.77μ and 8.13μ the substance, dissolved in methylene chloride, displays in the infrared absorption spectrum a band characteristic of a saturated thiol ester group at 5.90μ.

*Example 3*

100 grams of zinc filings (obtained in a finely powdered form by heating and agitation in vacuo), 2 grams of iodine and 140 cc. of absolute ether are introduced into a stirring flask fitted with dropping funnel and reflux condenser. While stirring this mixture at the boil, a solution of 89.8 grams of β-benzylmercapto-butanone-(3) and 77.2 grams of bromoacetic acid ethyl ester in 140 cc. of absolute ether is added dropwise. After a few cubic centimeters have been added, some mercuric chloride is added, whereupon a strongly exothermic reaction sets in soon. While keeping the mixture stirred, the solution is then added dropwise in a manner such that the reaction mixture keeps boiling without external heating. The reaction mixture is then refluxed for 2 hours and worked up as described in Example 1. The resulting oil is distilled in a high vacuum to yield 52.3 grams of β-methyl-β-hydroxy-delta-benzylmercapto valeric acid ethyl ester of the formula

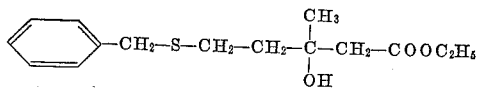

boiling at 125–145° C. under 0.1 mm. Hg pressure. In the infrared absorption spectrum a methylene chloride solution of this compound displays, inter alia, characteristic bands at: 2.85μ (hydroxyl); 5.85μ (ester), 6.23μ and 6.69μ (phenyl).

In the same manner starting from β-isopropyl-mercapto-butanone-(3) there is obtained β-methyl-β-hydroxy-δ-isopropylmercapto-valeric acid ethyl ester as a colorless oil boiling at 90° C. under 0.1 mm. of pressure of the formula

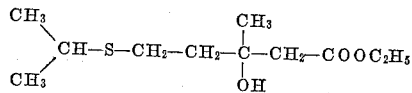

The starting material is obtained thus:

60 grams of benzylmercaptan are stirred dropwise at 0° C. into 34 grams of methyl-vinyl ketone, some anhydrous aluminum chloride is added, and the mixture is kept for 2 hours at 0° C. and then overnight at room temperature. The oil, obtained by heating for 2 hours on a steam bath, is distilled twice in a high vacuum to yield 64.4 grams of β-benzylmercapto-butanone-(3) boiling at 128–130° C. under a pressure of 0.2 mm. Hg. A solution of this compound in methylene chloride displays in the infrared absorption spectrum, inter alia, the following characteristic bands: 5.82μ (ketone); 6.23μ and 6.70μ (phenyl).

In the same manner from methyl-vinyl ketone and isopropylmercaptan there is obtained β-isopropylmercapto-butanone-(3) as a colorless oil boiling at 80–81° C. under 12 mm. pressure.

*Example 4*

While stirring and passing over a current of nitrogen at 60° C., 5.65 grams of β-methyl-β-hydroxy-δ-benzylmercapto-valeric acid ethyl ester (Example 3) in a mixture of 20 cc. of alcohol and 10 cc. of water are mixed dropwise with 20 cc. of N-sodium hydroxide solution in a manner such that the pH of the solution is constantly kept in the vicinity of the point at which phenolphthalein changes color (about 5 hours). The whole is then stirred for a further hour at 60° C., cooled to room temperature, rendered strongly acidic with hydrochloric acid, the alcohol is evaporated under reduced pressure, and the remaining aqueous suspension is extracted 3 times with chloroform. The chloroformic extracts are combined, washed with water and repeatedly extracted with aqueous sodium bicarbonate solution of 10% strength. The chloroformic layer is discarded, and the aqueous extracts are cautiously acidified with hydrochloric acid and then repeatedly extracted with chloroform. The chloroformic extracts are washed with water, dried, evaporated to dryness and yield an oil which is distilled in a bulb tube at 180° C. under 0.05 mm. Hg pressure without leaving any appreciable residue. In this manner there are obtained 3.2 grams of β-methyl-β-hydroxy-delta-benzylmercapto valeric acid of the formula

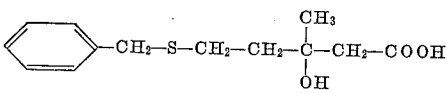

1.0 gram of this substance and 0.5 gram of N:N'-dibenzyl-ethylene diamine are dissolved in 10 cc. of methanol. After a short time N:N'-dibenzyl-ethylene-diammonium-bis-(β-methyl-β-hydroxy-delta-benzylmercapto valerate) begins to settle out as a colorless crystallizate. After having been recrystallized from alcohol this salt melts at 138–139° C.

In the same manner the β-methyl-β-hydroxy-δ-isopropylmercapto-valeric acid ethyl ester obtained as described in Example 3 can be hydrolyzed to β-methyl-β-hydroxy-δ-isopropylmercapto-valeric acid of the formula

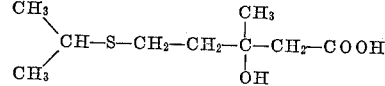

The free compound is a viscous oil which boils at 137–139° C. under 0.1 mm. pressure of mercury. The salt with N:N'-dibenzylethylenediamine melts at 150–152° C. after recrystallization from methanol and contains 1 mol of base per 2 mols of acid.

*Example 5*

74 grams (0.30 mol) of β-methyl-β-acetoxy-δ-mercapto-valeric acid ethyl ester, prepared as described in Example 1, are added to a solution of 7.3 grams (0.32 mol) of sodium in 280 cc. of absolute alcohol. The whole is allowed to stand for a few minutes and a solution of 44 grams (0.35 mol) of benzyl chloride in 130 cc. of absolute alcohol are then slowly added dropwise at room temperature while stirring. The mixture is boiled under reflux for 2 hours. After cooling, the precipitated sodium chloride is separated off, the filtrate is evaporated to dryness and taken up in ether. The ether solution is washed with aqueous sodium bicarbonate solution and water, dried over sodium sulfate and evaporated. The remaining yellow oil is distilled in high vacuum and there are obtained 38.9 grams of β-methyl-β-acetoxy-δ-benzylmercapto-valeric acid ethyl ester of the formula

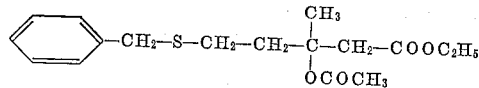

as a colorless oil boiling at 145–149° C. under 0.1 mm. pressure of mercury.

When methyl iodide is used in the place of benzyl chloride there is obtained by the same method β-methyl-β-acetoxy-δ-methylmercapto-valeric acid ethyl ester of the formula

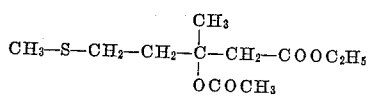

as an oil boiling at 84–87° C. under 0.2 mm. of pressure in a yield of 65%.

*Example 6*

38.9 grams (0.12 mol) of β-methyl-β-acetoxy-δ-benzylmercapto-valeric acid ethyl ester are dissolved in a mixture of 380 cc. of alcohol and 90 cc. of water. 142 cc. of N-sodium hydroxide solution are added dropwise in the course of 6 hours at 60° C. with stirring in a nitrogen atmosphere, and the whole is allowed to stand for several hours. The alcohol is then expelled under reduced pressure. The remaining aqueous solution is washed twice with ether, acidified and extracted several times with ether. The extract is washed once with water, dried and evaporated to dryness. The oily residue is distilled in a bulb tube and there are obtained 24.5 grams of an oil which passes over at 175° C. under 0.05 mm. pressure of mercury which is identical with the β-methyl-β-hydroxy-δ-benzylmercapto-valeric acid obtained in Example 4.

*Example 7*

190 cc. of N-sodium hydroxide solution are added dropwise in the course of 8 hours at 60° C. in an atmosphere of nitrogen to a solution of 23.5 grams of β-methyl-β-acetoxy-δ-methylmercapto-valeric acid ethyl ester, obtained as described in Example 5, in 180 cc. of aqueous alcohol of 75% strength, and the whole is allowed to stand overnight. The solution is then washed with water, dried and evaporated to dryness. The so-obtained oil is distilled and at the boiling point 100–130° C. under 0.1 mm. pressure of mercury there are obtained 10.4 grams of a mixture of crystals and oil. 12 cc. of ether-petroleum ether 1:1 are added in the distillate, the precipitated crystals are suction-filtered at 0° C. and the filtrate evaporated to dryness. 9.8 grams of oil are obtained as residue. The latter is dissolved in 60 cc. of aqueous methanol of 50% strength, 7 grams of N:N'-dibenzylethylenediamine are added and the whole allowed to stand overnight at room temperature. The crystalline material is suction-filtered and recrystallized twice from methanol. 4 grams of a colorless salt melting at 152–153° C. are obtained in which per mol of N:N'-dibenzyl-ethylene-diamine there are 2 mols of β-methyl-β-hydroxy-δ-methylmercapto-valeric acid of the formula

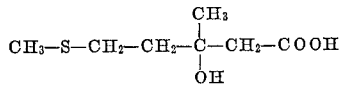

The free acid prepared from the salt is a colorless oil boiling at 123–125° C. under 0.1 mm. pressure of mercury.

*Example 8*

2 grams of β-methyl-β-hydroxy-delta-benzylmercapto valeric acid obtained as described in Example 4 or 6 in 10 cc. of benzene are introduced into a stirring flask of 350 cc. capacity, and 150 cc. of liquid ammonia are added. While keeping the mixture stirred, small pieces of sodium are added until the blue coloration ceases to disappear (0.65 gram). After 30 minutes some ammonium chloride is added, whereupon the mixture loses its color. The solution is allowed to evaporate to dryness overnight at room temperature, the residue is distributed between benzene and water, the aqueous phase is acidified and evaporated to dryness under reduced pressure at 40–50° C. and the residue is taken up in chloroform to which some anhydrous sodium sulfate has been added. After having been allowed to stand for some time, the whole is filtered, evaporated to dryness and the colorless oily residue—which quickly turns red on being exposed for some time to air—is distilled in a bulb tube at 100° C. under 0.05 mm. Hg pressure to yield 1.0 gram of β-methyl-β-hydroxy-delta-mercapto valeric acid thiolactone of the formula

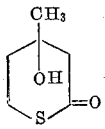

0.8 gram of this substance is allowed to stand overnight with half a molecular equivalent of N:N'-dibenzyl-ethylenediamine in 20 cc. of aqueous methanol of 50% strength. The mixture is then evaporated to dryness in vacuo and the crystalline residue recrystallized several times from absolute alcohol. There is obtained a salt-like compound in the form of colorless crystals melting at 151–152° C. in which N:N'-dibenzylethylenediamine and β-methyl-β-hydroxy-δ-mercapto-valeric acid of the formula

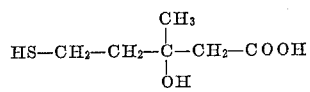

are present in a molecular proportion of 1:2.

What is claimed is:

1. β - Methyl-β-acetoxy-δ-mercapto-valeric acid ethyl ester.
2. β - Methyl-β-hydroxy-δ-benzylmercapto-valeric acid ethyl ester.
3. β-Methyl-β-hydroxy-δ-isopropylmercapto-valeric acid ethyl ester.
4. β - Methyl-β-acetoxy-δ-methylmercapto-valeric acid ethyl ester.
5. β-Methyl-β-hydroxy-δ-benzylmercapto-valeric acid.
6. β-Methyl-β-hydroxy - δ - isopropylmercapto-valeric acid.
7. β-Methyl-β-hydroxy-δ-methylmercapto-valeric acid.
8. β-Methyl-β-hydroxy-δ-mercapto-valeric acid.
9. N:N' - dibenzyl-ethylene-diammonium-bis-(β-methyl-β-hydroxy-δ-mercapto-valerate).
10. β-Methyl-β-hydroxy-δ-mercapto-valeric acid-δ-thiolactone.
11. An S-acyl derivative of the compound of claim 1, in which the acyl radical is lower fatty acid acyl.
12. An O-acyl derivative of the compound of claim 2, in which the acyl radical is lower fatty acid acyl.
13. A member selected from the group consisting of compounds of the formula:

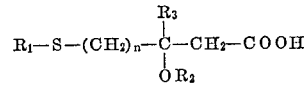

in which $R_1$ and $R_2$ represent members selected from the group consisting of hydrogen, lower alkyl, lower cycloalkyl, phenyl, mono-halo-phenyl, mono-hydroxy-phenyl, phenyl-lower alkyl, mono-halo-phenyl-lower alkyl, mono-hydroxy-phenyl-lower alkyl and an acyl radical selected from the group consisting of those of lower fatty acid acyl, halo-substituted lower fatty acid acyl and benzoic acid acyl, $R_3$ represents lower alkyl, and $n$ is an integer from one to eight, both inclusive, their alkali group salts, alkaline earth group salts and therapeutically useful amine acid-addition salts and functional carboxylic group derivatives selected from the group consisting of lower alkyl esters, benzyl esters and primary amides derived from ammonia.

References Cited in the file of this patent

UNITED STATES PATENTS

| | | |
|---|---|---|
| 2,745,745 | Blake et al. | May 15, 1956 |
| 2,872,455 | Bullock | Feb. 3, 1959 |
| 2,915,398 | Wright et al. | Dec. 1, 1959 |
| 2,915,531 | Wolf et al. | Dec. 1, 1959 |
| 2,945,059 | Shunk et al. | July 12, 1960 |
| 2,946,818 | Anagnostapoulas et al. | July 26, 1960 |

OTHER REFERENCES

Koelsch: Journal Am. Chem. Soc., vol. 52, pages 1105–1108 (1930).

Lowy et al.: An Introduction to Organic Chemistry, 7th ed., John Wiley & Sons Inc., New York, N.Y., 1951, pages 215–216.